March 31, 1970 W. J. BUDD, JR., ET AL 3,503,253

DUROMETER INSTRUMENT

Original Filed Dec. 2, 1965 2 Sheets-Sheet 1

INVENTORS
Walter J. Budd, Jr.
Fred Allen Mauger
BY
*James R. Hulen*
ATTORNEY

United States Patent Office 3,503,253
Patented Mar. 31, 1970

3,503,253
DUROMETER INSTRUMENT
Walter J. Budd, Jr., Waterbury, and Fred A. Mauger, Cheshire, Conn., assignors to Uniroyal, Inc., New York, N.Y., a corporation of New Jersey
Continuation of application Ser. No. 511,190, Dec. 2, 1965. This application Nov. 1, 1968, Ser. No. 772,696
Int. Cl. G01n 3/42
U.S. Cl. 73—81         5 Claims

ABSTRACT OF THE DISCLOSURE

An instrument for measuring the hardness of rubber which has the advantages of obtaining more uniform, accurate and reproducible readings. The instrument operates automatically and allows the test specimen to be changed while the instrument continues to operate continuously. The instrument utilizes a durometer slidably supported along a vertical column. A channel for a stabilizing arm prevents rotation of the durometer with respect to the vertical column. A cam and cam follower are utilized to control the operating cycle. The weight of the durometer, the slidable support, and the stabilizing arm is directly applied to the cam. The rotation of the cam is effective to move the durometer towad and away from the specimen.

---

This application is a continuation of applicants' co-pending application, Ser. No. 511,190 and now abandoned filed Dec. 2, 1965 and entitled "Durometer."

This invention relates to durometers for measuring the hardness of rubber, and, more particularly, to a mechanism for improving the accuracy and speed of a standard durometer. When used herein the term "rubber" is intended to include natural and synthetic rubbers and other plastic materials normally associated with durometer testing.

The American Society of Testing Machines method D–676–59T for Indentation of Rubber by Means of a Durometer requires that pressure be applied over a small area of the test specimen by a blunt point or a presser foot. In prior instruments the pressure was applied by the manual release of a dead-weighted presser foot and the penetration of the presser foot below the plane of the surface of the specimen was a measure of the hardness of the rubber. This hardness was indicated on a dial mounted on the durometer.

It has been found that the test results obtained from a manually operated durometer vary widely from one operator to the next. This is also true with different readings by the same operator, since one operator does not always use the same technique while releasing the presser foot.

The penetration of the surface of a test specimen is dependent upon the following four factors: (1) the properties of the surface and sub-surface of the specimen, (2) the total energy of the presser foot at the instant of contact, (3) the shape of the presser foot, and (4) the time and pressure is applied (both the instantaneous rate and the total duration).

Obviously, it is desirable to uniformly control as many of the above factors as possible in order to provide uniform and accurate test results. With the prior manual operations only the shape of the presser foot was fixed.

Accordingly, it is an object of the present invention to provide a mechanism for obtaining more uniform and accurate results by better controlling the factors affecting the pentration readings.

A further object is to provide a motorized mechanism that enables the application of pressure automatically and reproducibly.

A still further object is to provide a mechanism that is simple to operate and, yet eliminates the effect of operator technique.

An additional object is to provide an improved durometer instrument with an increased productive capacity and precision of operation.

These and other objects are accomplished in accordance with this invention which comprises a durometer having a presser foot for penetrating the surface of a test specimen and a dial for indicating the depth of said penetration; means for slidably supporting the durometer for vertical movement toward and away from the specimen; a cam follower rotatably secured to the support means; a cam rotatably supported adjacent the follower; and means for rotating the cam, the rotation of the cam being effective to move the durometer toward and away from the specimen.

For a better understanding of the present invention together with other and further objects thereof, reference is made to the following description, taken in connection with the accompanying drawings, and its scope will be pointed out in the appended claims.

Referring now to the drawings.

Figures 1, 3:
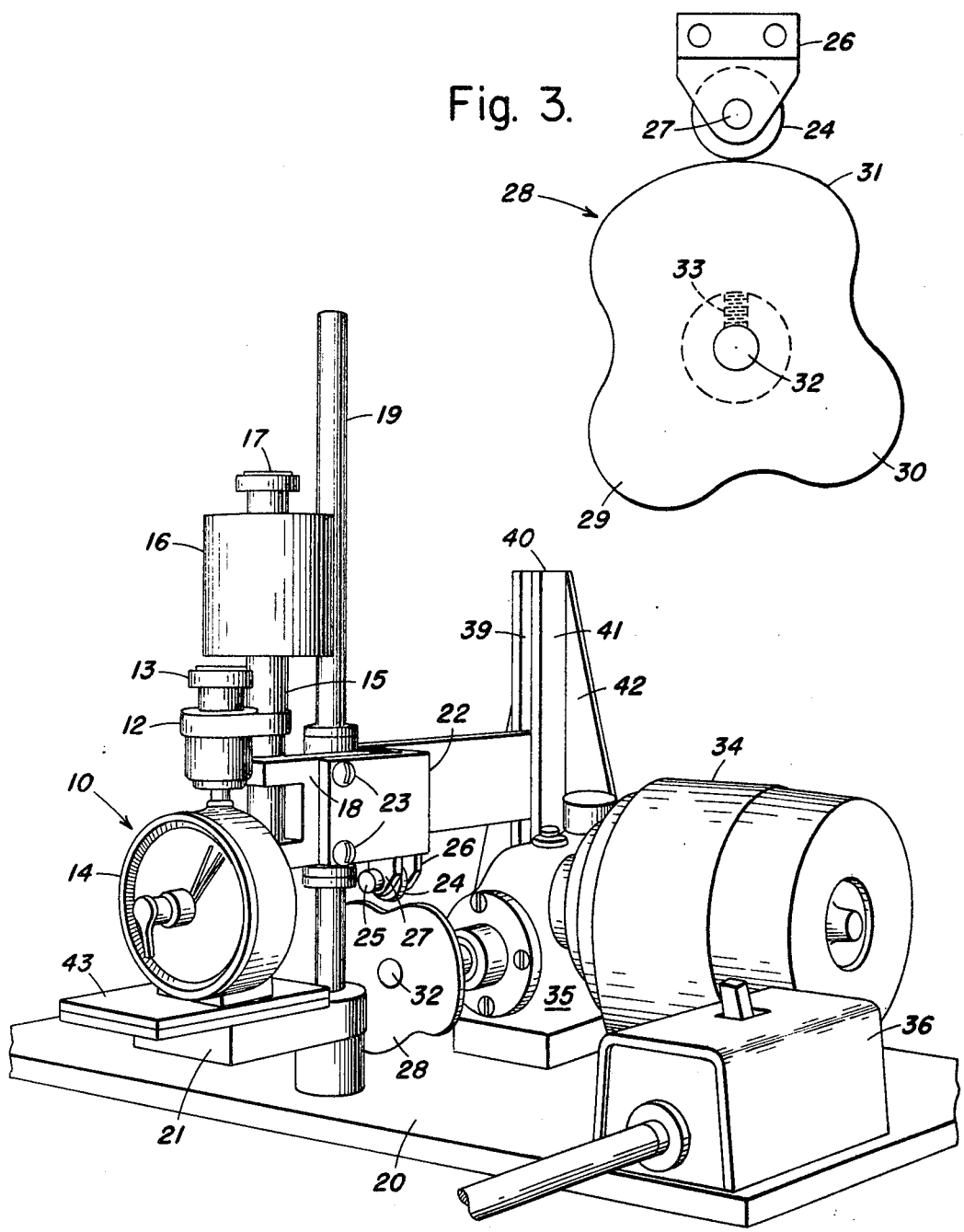
FIG. 1 is a perspective view of the improved durometer of the present invention.
FIG. 3 is an elevational view showing the preferred construction of the cam and cam follower used with the present invention.

Referring to the drawings, a durometer 10 having a presser foot 11 (see FIG. 2) is secured to a bracket 12 with a screw 13. Durometer 10 has a dial 14 for indicating the depth of penetration of presser foot 11 into the surface of a test specimen. The durometer illustrated in this application is a Shore standard durometer, which durometer is manufactured by the Shore Instrument & Manufacturing Company, Inc. 90–35 Van Wyck Expressway, Jamaica, N.Y. This durometer is illustrated and described in Bulletin R–13 published by the above-mentioned company. Although the invention is illustrated with a Shore durometer, any device that operates on the principle of surface penetration by a fixed design presser foot under gravity pressure is within the scope of this invention and may be used therewith.

Bracket 12 is secured to stud 15 which supports a weight 16 secured to the stud by screw 17. Stud 15 is supported in a vertical position by a bracket 18 which is slidably mounted on column 19. The base of column 19 is secured to a substantially horizontal plate 20 and an anvil 21 extends outwardly from the base of column 19 to receive the test specimen and support it directly below presser foot 11.

Durometer 10 and the entire support assembly is free to move in a vertical direction on column 19 toward and away from the test specimen supported on anvil 21. Previous durometer assemblies were constructed in such a manner that it was necessary for an operator to manually release the assembly to bring it into contact with the test specimen. It was possible for different operators to release the assembly in different ways, thus, yielding a wide variety of test results.

The present invention contemplates the addition of a motorized mechanism to the above described assembly to thereby provide a uniform means for raising and lowering durometer 10 toward and away from the test specimen and for uniformly controlling the time that the presser foot 11 is in contact with the test specimen.

Figure 2:
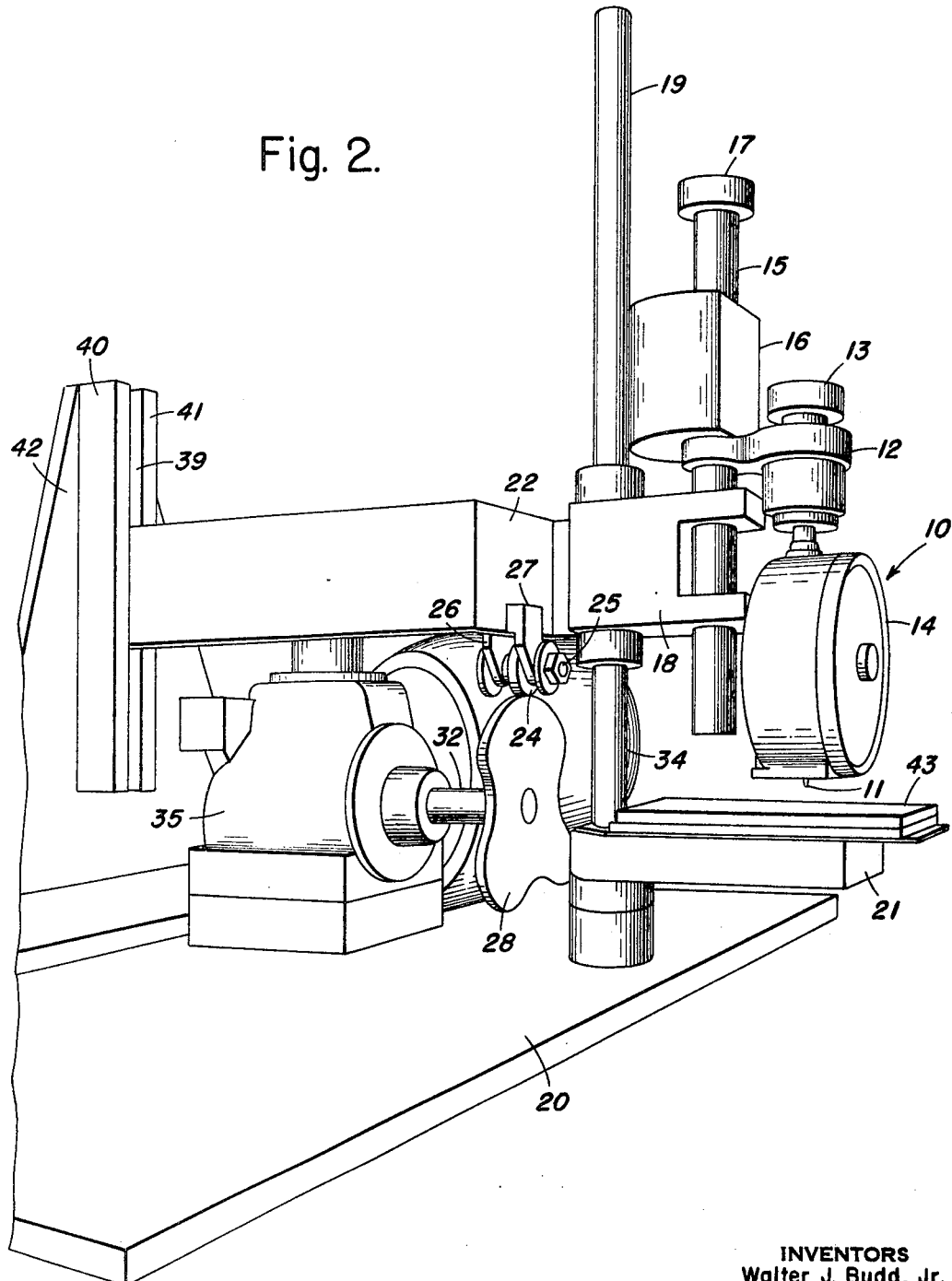
FIG. 2 is a perspective view showing the side opposite to that shown in FIG. 1.

Referring to FIGS. 1 and 2, a stabilizing arm 22 is secured to bracket 18 by screws 23. A cam follower 24 is rotatably secured to stabilizing arm 22 by a shaft 25 which extends between brackets 26 and 27.

To accomplish the vertical movement of the durometer assembly toward and away from the test sample, a cam 28 is provided. A preferred construction of cam 28 is shown at FIG. 3. The cam is so constructed that for each revolution thereof the durometer 10 will be lowered and raised three times. This is accomplished by providing three lobes 29, 30 and 31, on the circumferential surface of the cam. This construction enables the operator to place a test specimen on anvil 21 during the dwell provided by the relatively large lobe 31. While lobe 31 is in contact with cam follower 24 the operator has sufficient time to properly position the test specimen on the anvil. The continued rotation of cam 28 results in lowering and raising of durometer 10 three times during a single revolution. This enables the operator to take three individual readings and to thereby obtain an accurate average reading.

Cam 28 is secured to a shaft 32 by a set screw 33. Shaft 32 is driven by electric motor 34 through an appropriate set of gears located in gear box 35. A conventional switch 36 may be used to control the on-off condition of motor 34.

In addition to the vertical movement imparted to cam follower 24 by cam 28, a lateral or rotational movement also tends to occur. The tendency of stabilizing arm 22 to rotate about column 19 is compensated for by the provision of guide channel 39. An extension of stabilizing arm 22 is positioned between vertical beams 40 and 41 which form channel 39'. Beams 40 and 41 are secured to an A frame 42 which, in turn, is supported atop plate 20. Although the above described guide channel has been found to be very effective in preventing rotation of the assembly about column 19, other means may also be used to accomplish this function.

The operation of the improved motorized durometer can be initiated when lobe 31 is in contact with cam follower 24, as illustrated in FIG. 2, and durometer 10 is thereby located in a vertical position remote from anvil 21. A test specimen 43 is properly positioned on top of anvil 21 and the continued rotation of cam 28 causes durometer 10 to be lowered into contact with specimen 43 by the passage of cam follower 24 into the valley adjacent lobe 31. Presser foot 11 penetrates the upper surface of specimen 43 and the depth of the penetration may be recorded by the operator from dial 14. The continued rotation of cam 28 again causes durometer 10 to rise vertically as lobe 29 contacts cam follower 24. The three desired readings may thus be taken as cam 28 completes one full revolution and the location of cam follower 24 within the three valleys separating lobes 29, 30 and 31 occurs. The rotational speed of cam 28 is not critical; however, the speed of the overall operation is limited by the time required for an operator to accurately position the test specimen and the time required for the presser foot to be raised and lowered the desired number of times.

It will be apparent from the foregoing description, that the new instrument greatly improves the precision of the standard durometer test and at the same time decreases the time required to perform this test.

The new durometer instrument design controls three of the factors on which the accuracy of a penetration test depends, which factors were heretofore uncontrolled by the prior manual operation. The energy and rate of application of the presser foot to the test specimen is controlled by cam release and the total dwell time of application on the test specimen is also controlled by the cam. The guesswork involved in both the application and the dwell time have been eliminated by the new design.

While there has been described what is at present considered to be the preferred embodiment of this invention, it will be obvious to those skilled in the art that various changes and modifications may be made therein without departing from the invention, and it is, therefore, aimed to cover all such changes and modifications, as fall with the true spirit and scope of the invention.

Having thus described our invention, what we claim and desire to protect by Letters Patent is:

1. An instrument for measuring the hardness of rubber comprising: a durometer having a presser foot for penetrating the surface of a test specimen and means for measuring the depth of the penetration during the occurrence of said pentration by said presser foot; means for movably supporting said durometer for vertical movement toward and away from said specimen; fixed supporting means for supporting said movable supporting means; means for preventing rotation of said movable supporting means with respect to said fixed supporting means; a cam follower rotatably secured to said movable supporting means; a cam rotatably supported adjacent said follower by said fixed supporting means; the weight of said durometer and said movable supporting means being directly applied to said cam; and means for rotating said cam, the rotation of said cam being effective to move said durometer toward and away from said specimen.

2. The instrument of claim 1 wherein said cam is constructed with three lobes so that three individual readings of hardness may be obtained for each revolution of said cam.

3. An instrument for measuring the hardness of rubber comprising: a durometer having a presser foot for penetrating the surface of a test specimen and dial means for indicating the depth of the penetration during the occurence of said penetration by said presser foot; a vertically supported column; means for slidably supporting said durometer on said column; a stabilizing arm secured to said supporting means; means for preventing rotation of said arm about said column; a cam follower rotatably secured to said arm; a cam mounted for rotation adjacent said follower; the weight of said durometer and said slidable supporting means being directly applied to said cam; and means for rotating said cam, the rotation of said cam being effective to move said durometer toward and away from said specimen.

4. The instrument of claim 3 wherein said cam is constructed with three lobes and three valleys so that one revolution of said cam provides three readings of the hardness of said specimen.

5. The instrument of claim 4 wherein one of said cam lobes is larger than the others to provide a sufficient dwell period to enable an operator to substitute specimens during the continuous rotation of said cam.

References Cited

UNITED STATES PATENTS

| | | | |
|---|---|---|---|
| 1,646,195 | 10/1927 | German | 73—81 |
| 1,770,045 | 7/1930 | Shore et al. | 73—81 |

JERRY W. MYRACLE, Primary Examiner

PO-1050
(5/69)

UNITED STATES PATENT OFFICE
CERTIFICATE OF CORRECTION

Patent No. 3,503,253          Dated March 31, 1970

Inventor(s) WALTER J. BUDD, JR. AND FRED A. MAUGER

It is certified that error appears in the above-identified patent and that said Letters Patent are hereby corrected as shown below:

column 4 line 18 for "pentration" read --penetration-- column 4 line 45 for "and" read a comma --,-- column 4 line 46 after "means" read --and said stabilizing arm--

SIGNED AND
SEALED
DEC 1 1970

(SEAL)
Attest:

Edward M. Fletcher, Jr.
Attesting Officer

WILLIAM E. SCHUYLER, JR.
Commissioner of Patents